(12) United States Patent
Tsuyuki

(10) Patent No.: US 6,736,112 B2
(45) Date of Patent: May 18, 2004

(54) FUEL INJECTION CONTROL OF DIESEL ENGINE

(75) Inventor: Masahiko Tsuyuki, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 68 days.

(21) Appl. No.: 10/084,969

(22) Filed: Mar. 1, 2002

(65) Prior Publication Data
US 2002/0121265 A1 Sep. 5, 2002

(30) Foreign Application Priority Data
Mar. 1, 2001 (JP) ........................... 2001-056358

(51) Int. Cl.[7] .............................................. F02M 51/00
(52) U.S. Cl. ..................... 123/478; 123/446; 123/357
(58) Field of Search ................... 123/357, 446, 123/478, 680

(56) References Cited

U.S. PATENT DOCUMENTS 6,308,698 B1 * 10/2001 Shioi et al. .................. 123/680

2002/0020396 A1 * 2/2002 Sakamoto .................... 123/492

FOREIGN PATENT DOCUMENTS

JP 11-036962 A1 2/1999

* cited by examiner

Primary Examiner—Mahmoud Gimie
Assistant Examiner—Arnold Castro
(74) Attorney, Agent, or Firm—Foley & Lardner LLP

(57) ABSTRACT

Experiment shows that a diesel engine discharges more smoke at a lower rate of increase of an engine rotation speed. Reducing an amount of fuel to inject into the engine when the rate of increase of the engine rotation speed is slow can prevent smoke generation. To be more specific, a controller (1) computes the rate of increase of the engine rotation speed by using signals from sensors that detect a vehicle condition. The controller (1) contains maps that indicate a correction coefficient corresponding to the rate of increase of the engine rotation speed. The controller (1) calculates the amount of fuel to inject based on the correction coefficient. Using the calculated amount of fuel, the smoke discharge from the diesel engine is suppressed.

12 Claims, 17 Drawing Sheets

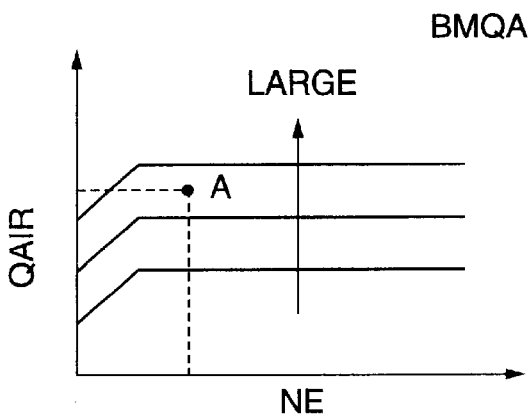
FIG. 15A CORRECTED AMOUNT OF FUEL INJECTION (LOW SPEED GEAR REGION)
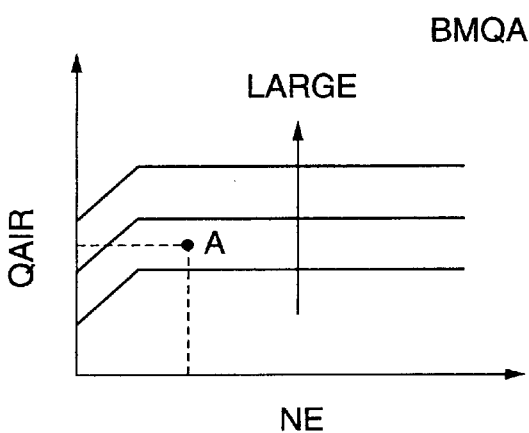
FIG. 15B CORRECTED AMOUNT OF FUEL INJECTION (MIDDLE SPEED GEAR REGION)
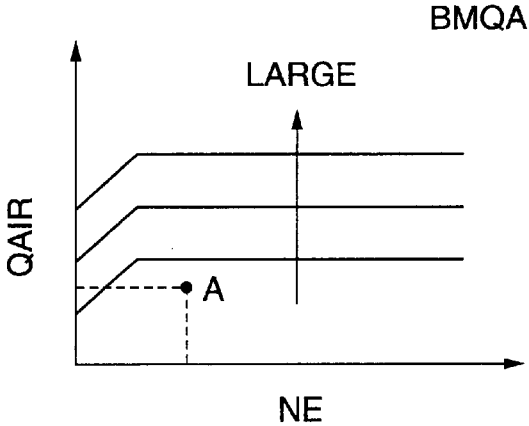
FIG. 15C CORRECTED AMOUNT OF FUEL INJECTION (HIGH SPEED GEAR REGION)

FIG. 17A
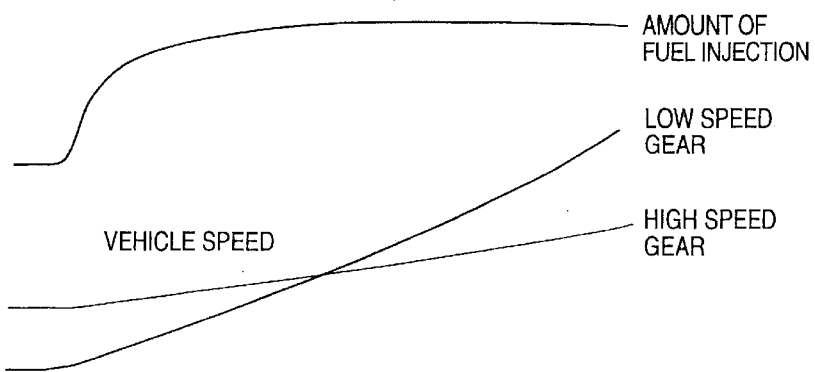
FIG. 17B
FIG. 17C
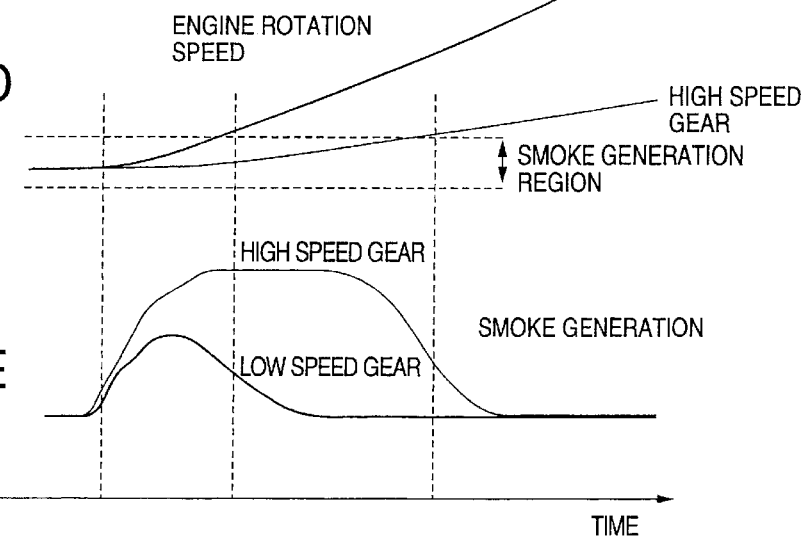
FIG. 17D
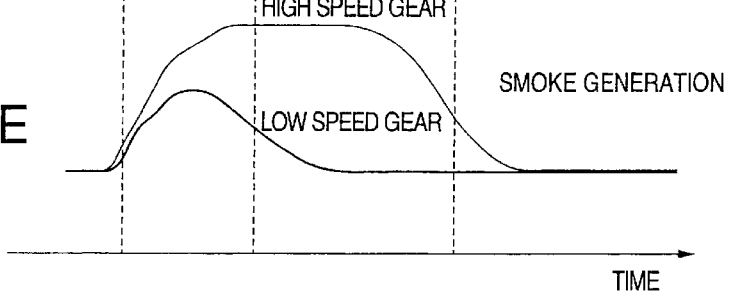
FIG. 17E

FUEL INJECTION CONTROL OF DIESEL ENGINE

FIELD OF THE INVENTION

This invention relates to fuel injection control of a diesel engine.

BACKGROUND OF THE INVENTION

Tokkai Hei 11-36962 published by the Japanese Patent Office in 1999 discloses a diesel engine control device which suppresses smoke generation in a diesel engine. This diesel engine control device controls a fuel injection to keep the excess air ratio lower than 1 at a low engine rotation speed and a low engine load.

SUMMARY OF THE INVENTION

When a vehicle is accelerated from a low engine rotation speed by depressing an accelerator pedal, an engine emits more smoke when the engine slowly increases its rotation speed than when the engine quickly increase its rotation speed.

However, in the prior art, the rate of increase of the engine rotation speed is not taken into consideration. Hence, when the vehicle is accelerated from the low rotation speed by depressing the accelerator pedal, the amount of smoke increases if the rate of increase of the engine rotation speed is low.

Therefore, the object of this invention is to control the excess air ratio in response to the rate of increase of the engine rotation speed.

To achieve the above objects, this invention provides a fuel injection control device for use with a diesel engine mounted on a vehicle, the diesel engine comprising a fuel injector that injects fuel into a combustion chamber.

The device comprises a sensor which detects a running state of the vehicle, a sensor which detects a state of increase of an engine rotation speed, and a programmable controller. The programmable controller is programmed to calculate a required amount of fuel injection based on the running state of the vehicle, set an upper limit of an amount of fuel injection based on the state of increase of the engine rotation speed, calculate a corrected amount of fuel injection by limiting the required amount of fuel injection by the upper limit, and control the amount of fuel injection of the fuel injector to the corrected amount of fuel injection.

The details as well as other features and advantages of this invention are set forth in the remainder of the specification and are shown in the accompanying drawings.

BRIEF DESCRIPTION OF THE DRAWINGS

FIGS. 15A–15C are diagrams describing the characteristics of a map of the corrected amount of fuel injection for the purpose of suppressing smoke generation, stored by the controller according to the fifth embodiment of this invention.

FIGS. 17A–17E are timing charts showing research results of the inventors with respect to acceleration and smoke generation in a vehicle driven by a diesel engine.

DESCRIPTION OF THE PREFERRED EMBODIMENTS

Referring to FIG. 17, the research results of the inventors relating to acceleration and smoke generation in a vehicle which is equipped with a diesel engine, will be described.

When an accelerator is depressed from when the engine is in a low rotation speed region, a fuel injection amount gradually increases. This fuel injection amount curve is drawn based on the values determined by conventional fuel control techniques.

When a low speed gear is used, the engine rotation speed rises quickly. Therefore, as shown by the bold line in FIG. 17E, the amount of generated smoke is small. Also, the time for which smoke is generated is short.

Conversely, when a high speed gear is used, the engine rotation speed rises gradually. Therefore, as shown by the thin line in FIG. 17E, the amount of generated smoke increases. Also, as the engine rotation speed does not easily leave the speed at which smoke is generated, the time period during which smoke generation occurs is large.

This invention is based on the above analysis.

Figure 1:
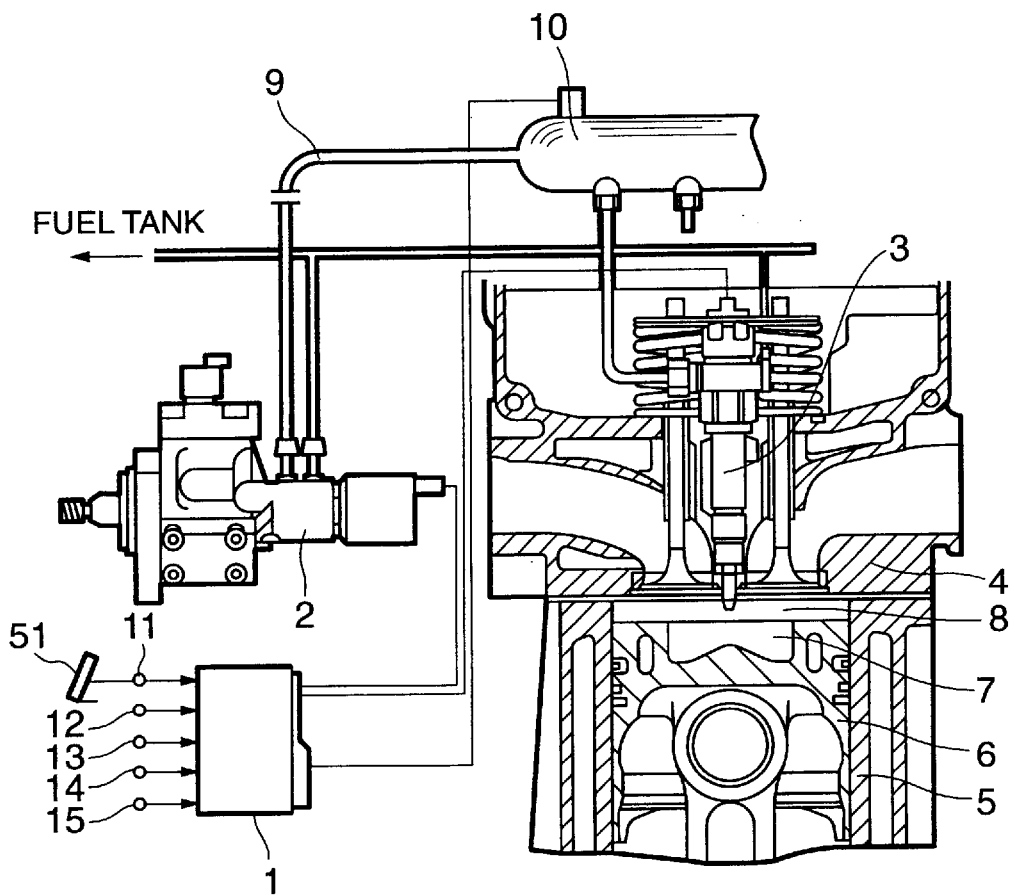
FIG. 1 is a schematic diagram of an engine with a fuel injection control device according to this invention.

Referring to FIG. 1 of the drawings, a diesel engine comprises a cylinder head 4 and plural cylinders 5 covered by the cylinder head 4. In each cylinder 5, a piston 6 reciprocates due to combustion of fuel injected from a fuel injection valve 3. A fuel injection pump 2 compresses fuel to a predetermined pressure and supplies pressurized fuel to a common rail 10 via a high pressure pipe 9. The common rail 10 supplies fuel to the fuel injection valves 3 at a constant pressure. Thus, by opening any of the fuel injection valves 3, fuel is directly injected into a combustion chamber 8 in the corresponding cylinder 5.

In order to control the amount and pressure of fuel injection, the control device according to this invention comprises a controller 1. The controller 1 comprises a microcomputer having a central processing unit (CPU), a random access memory (RAM), a read-only memory (ROM), and an input/output interface (I/O interface). The controller 1 controls the injection amount by controlling the fuel injection period of a fuel injection valve 3 by an injection signal. Also, based on a running condition of the vehicle, the controller 1 determines the fuel pressure, and the controller 1 feedback controls the discharge pressure of the fuel injection pump 2 to maintain the fuel pressure at a predetermined value. To determine the fuel injection period by the fuel injection valve 3, a crank angle sensor 12 which detects an engine rotation speed NE, an accelerator pedal depression sensor 11 which detects an accelerator pedal depression ACCEL, an air flow meter 15 which detects an intake fresh air amount QAIR, and a vehicle speed sensor 13 which detects a vehicle speed VSP are connected to the controller 1.

Figure 2:
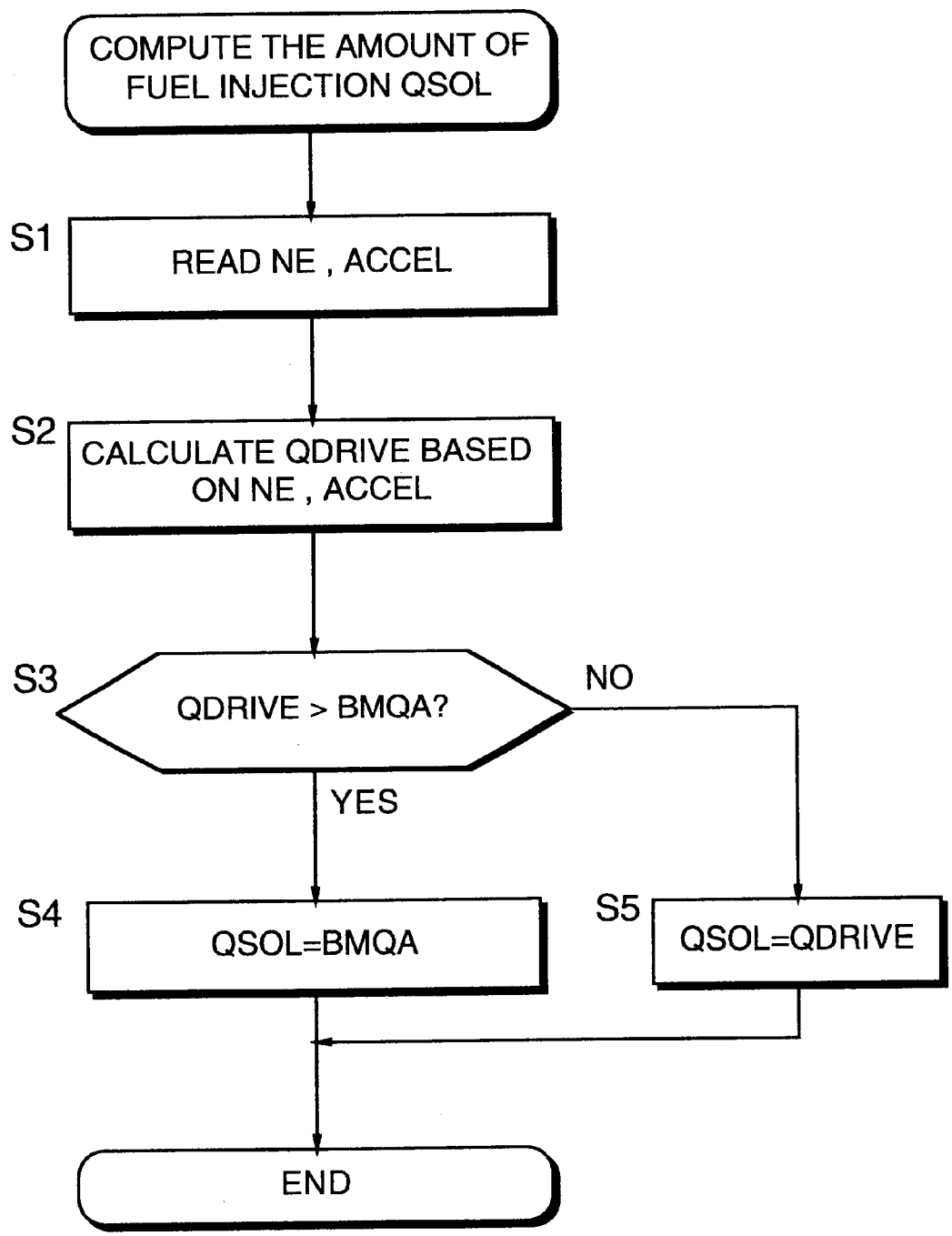
FIG. 2 is a flowchart describing a routine for computing the amount of the injection fuel performed by a controller according to this invention.
Figure 4:
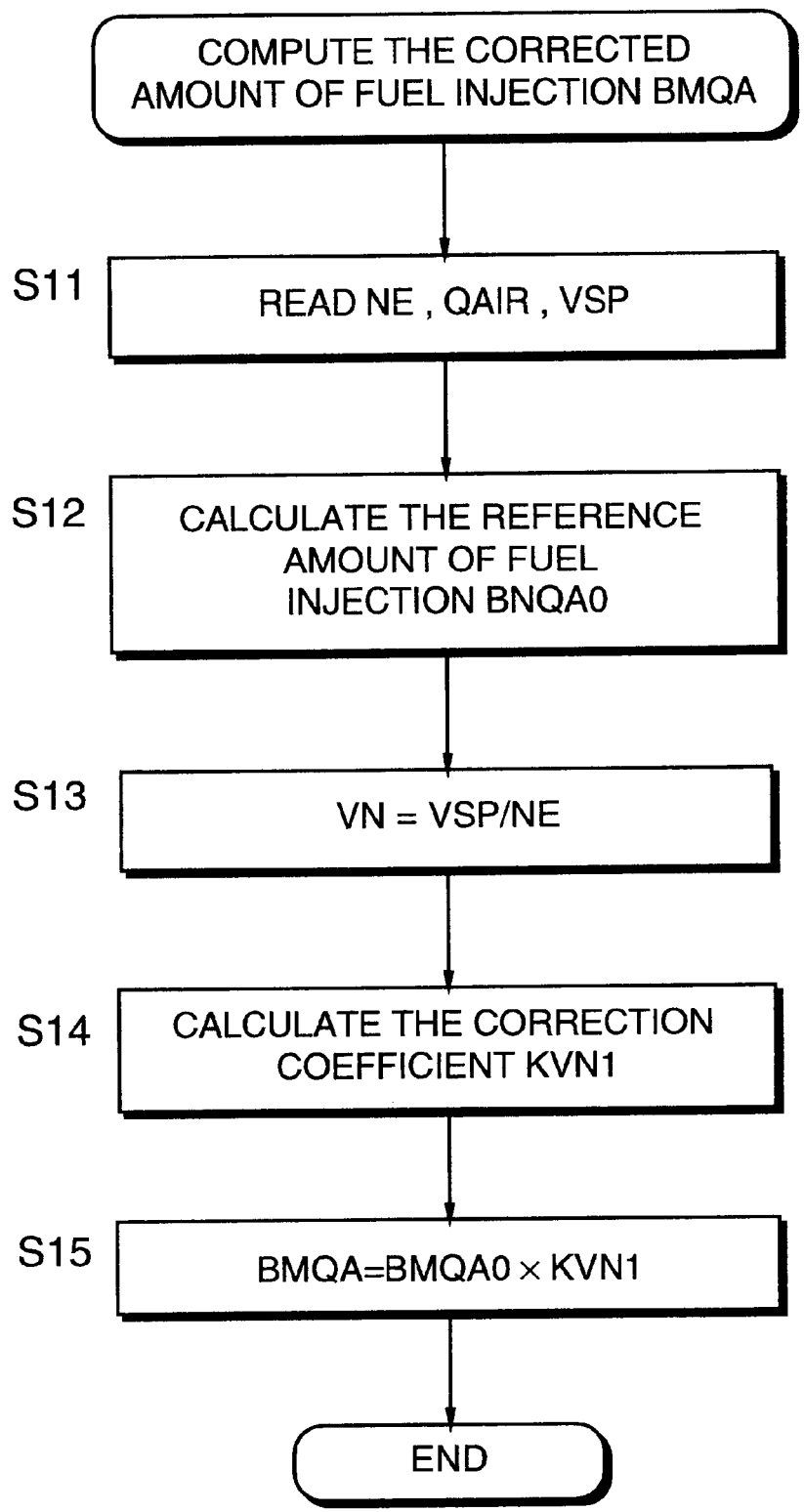
FIG. 4 is a flowchart describing a routine for computing a corrected amount of fuel injection for suppressing smoke generation, performed by the controller.

To perform the above control, the controller 1 determines the amount of fuel injection by executing a routine shown in FIG. 2 and FIG. 4.

Figure 3:
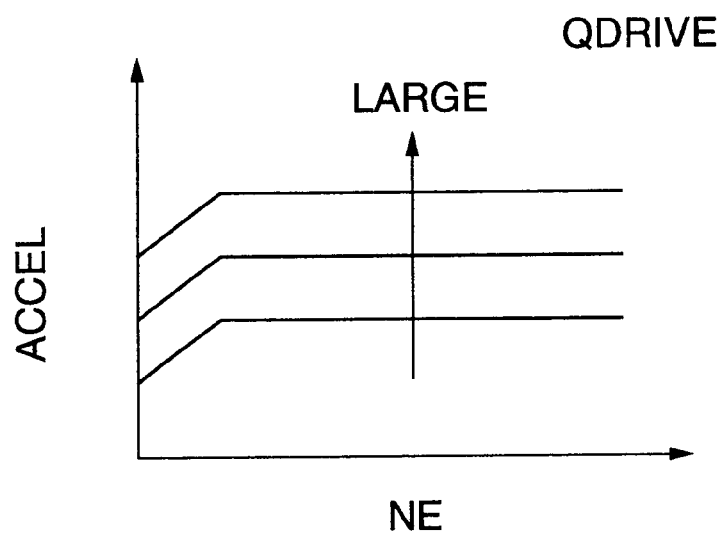
FIG. 3 is a diagram describing the characteristics of a map of a required amount of fuel injection relative to accelerator pedal depression, stored by the controller.

Referring to FIG. 2, in a step S1, the engine rotation speed NE and accelerator pedal depression ACCEL are read. In a step S2, a required amount of fuel injection QDRIVE corresponding to the engine rotation speed NE and accelerator pedal depression ACCEL is computed by looking up a map having the characteristics shown in FIG. 3. This map is stored beforehand in the memory of the controller 1. The required amount of fuel injection QDRIVE is the amount of fuel injection required to realize the engine torque required by the driver, and it is a value prior to correction for suppressing smoke generation.

In a step S3, the required amount of fuel injection QDRIVE is compared with a corrected amount of fuel injection BMQA for suppressing smoke. The routine for computing the corrected amount of fuel injection BMQA will be described later. When the required amount of fuel injection QDRIVE is larger than the corrected amount of fuel injection BMQA, smoke will be generated if the required amount of fuel injection QDRIVE is applied to an amount of fuel injection QSOL. Hence, the controller 1 limits the amount of fuel injection QSOL to the corrected amount of fuel injection BMQA in a step S4. The control of the fuel injection valve 3 is performed based on the amount of fuel injection QSOL.

On the other hand, if the required amount of fuel injection QDRIVE does not reach the corrected amount of fuel injection BMQA, the controller 1 sets the required amount of fuel injection QDRIVE to the amount of fuel injection QSOL without modification in a step S5.

Figure 5:
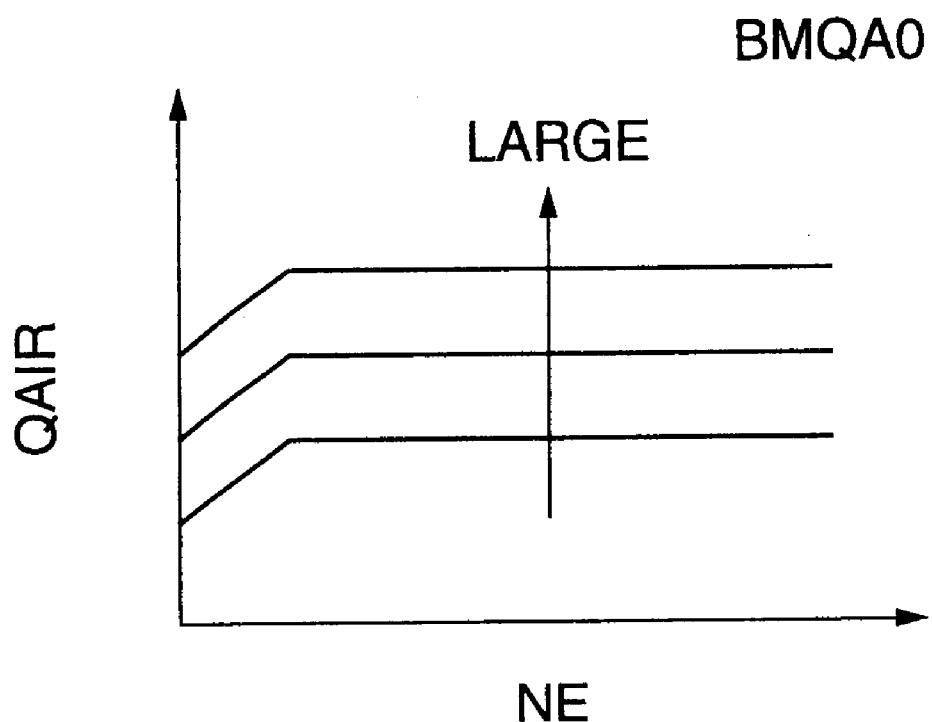
FIG. 5 is a diagram describing the characteristics of a map of a reference amount of fuel injection for suppressing smoke generation, stored by the controller.

Next, referring to FIG. 4, a routine for computing the corrected amount of fuel injection BMQA for suppressing smoke will be described. In a step S11, the controller 1 reads the engine rotation speed NE, the intake fresh air amount QAIR, and the vehicle speed VSP. In a step S12, a reference amount of fuel injection BMQAO for suppressing smoke generation corresponding to the engine rotation speed NE and the intake fresh air amount QAIR is computed from a map having the characteristics shown in FIG. 5. The reference amount of fuel injection BMQAO is the maximum fuel amount to be injected without generating smoke in the steady state, and the reference amount of fuel injection BMQAO increases as the intake fresh air amount QAIR increases.

In a step S13, a ratio of the vehicle speed VSP to the engine rotation speed NE is computed by the following equation:

$$VN = VSP/NE$$

This ratio VN corresponds to the inverse of the speed ratio of the vehicle transmission.

Figure 6A:
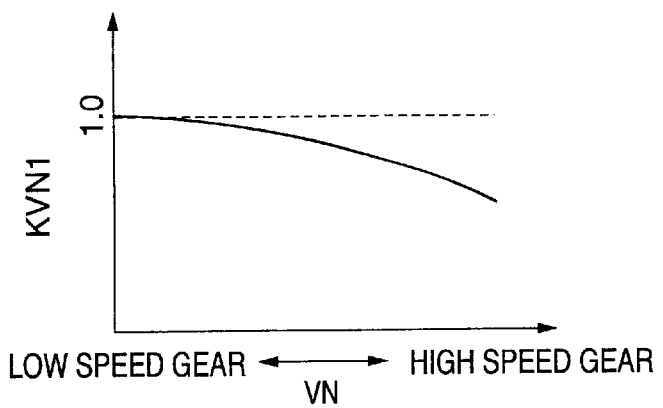
FIGS. 6A–6C are diagrams describing the characteristics of a map of a correction coefficient according to a speed ratio, stored by the controller.

In a step S14, a correction coefficient KVN1 based on the ratio VN found above, is looked up from a map having the characteristics shown in FIG. 6A, and the corrected amount of fuel injection BMQA is computed.

FIG. 6A is a curve of the correction coefficient KVN1 relative to the ratio VN. KVN1 takes the maximum value of 1.0 when the ratio VN takes a minimum value. The correction coefficient KVN1 decreases as the ratio VN increases. When the ratio VN has a large value, it represents the fact that the vehicle is running under a high speed gear. When the ratio VN has a small value, it represents the fact that the vehicle is running under a low speed gear. In general, at the same vehicle speed, when the vehicle is running under a high speed gear, acceleration performance is poorer and the rate of increase of engine rotation speed is slower compared to the rate of increase of engine rotation speed when the vehicle is running under a low speed gear. Thus, the time spent in the engine rotation speed region where smoke is easily generated is longer. Hence, by setting the correction coefficient KVN1 to a value less than 1.0 when the vehicle is running under a high speed gear, the corrected amount of fuel injection BMQA becomes smaller than the reference amount of fuel injection BMQAO and smoke generation is suppressed.

In a step S15, a value obtained by multiplying the correction coefficient KVN1 by the reference amount of fuel injection BMQAO is computed as the corrected amount of fuel injection BMQA. The corrected amount of fuel injection BMQA is used for determining the amount of fuel injection in the step S3 of the flowchart of FIG. 2.

On the other hand, under the low speed gear, the time spent in the region where the engine easily discharges smoke is short, so there is little need to suppress the injection amount in order to suppress smoke. In this case, the suppressing value is not reduced by making the correction coefficient KVN1 1.0 to obtain a good vehicle acceleration performance. Thus, by setting the corrected amount of fuel injection BMQA for suppressing smoke according to the ratio VN of the vehicle speed VSP to the engine rotation speed NE, smoke generation when the vehicle is running under a high speed gear is suppressed, while good vehicle acceleration performance is maintained when the vehicle is running under a low speed gear.

Figure 6B:
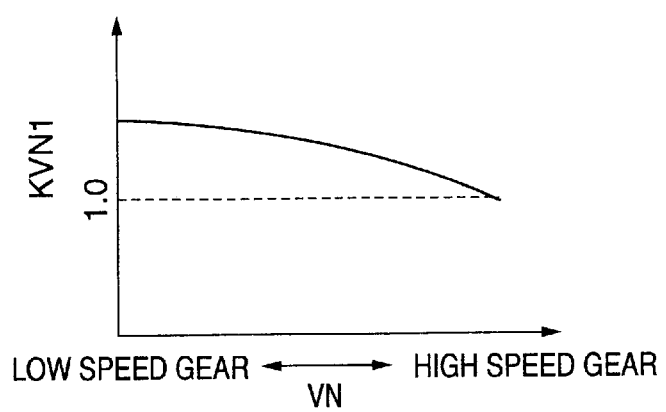
Figure 6C:
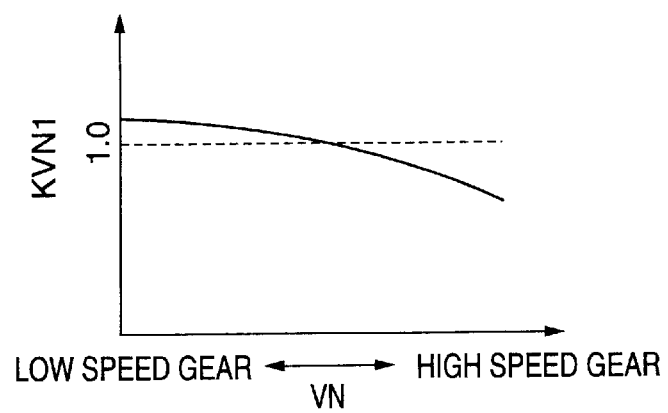
Figure 7A:
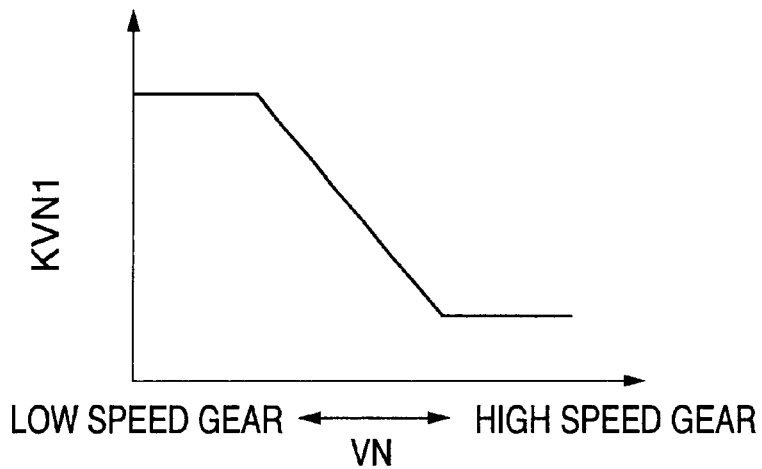
FIGS. 7A–7B are diagrams of other possible characteristics relating to the map of the correction coefficient according to the speed ratio.
Figure 7B:
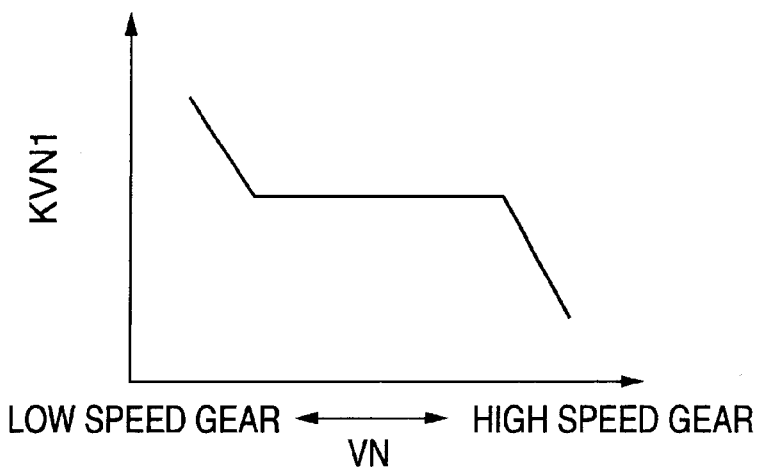

According to this embodiment, the correction coefficient KVN1 is set to 1.0 when the ratio VN is the minimum value, but a value other than 1.0 may also be applied as shown in FIGS. 6B and 6C. The characteristics of the variation of the correction coefficient KVN1 may also be represented by a straight line having a horizontal portion as shown in FIGS. 7A and 7B, instead of the curve shown in FIGS. 6A–6C.

Figure 8:
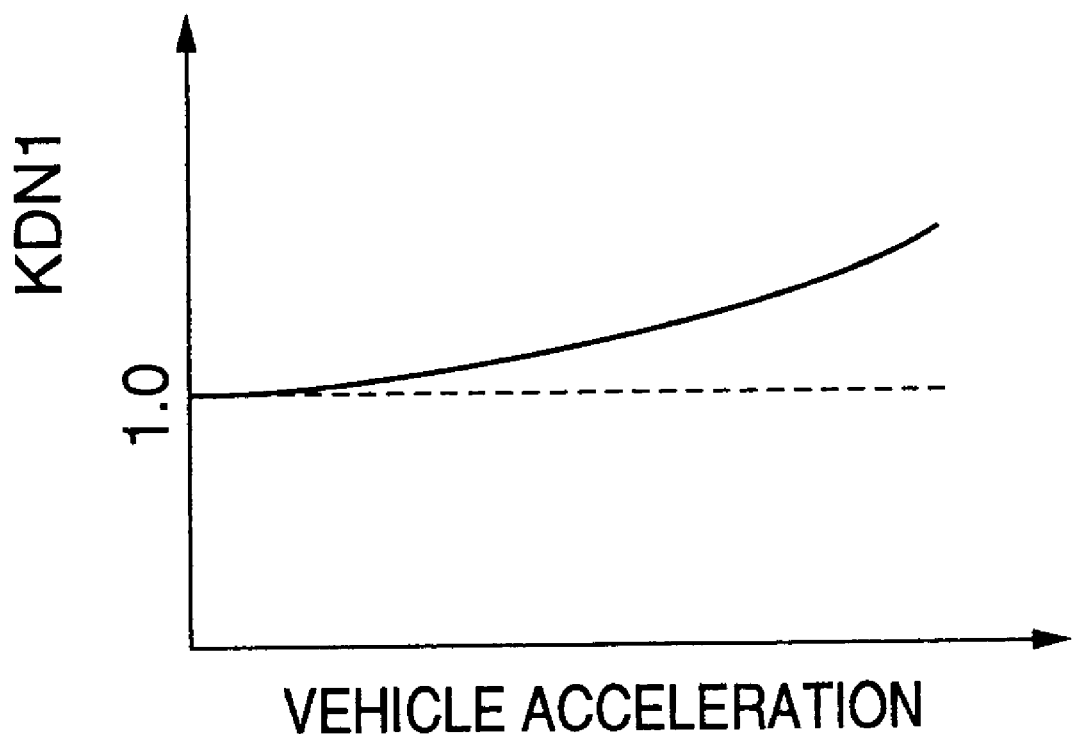
FIG. 8 is a diagram describing the characteristics of a map of a correction coefficient according to a vehicle acceleration, stored by the controller according to a second embodiment of this invention.

Next, referring to FIG. 8, a second embodiment of this invention will be described. According to this embodiment, the controller 1 determines the corrected amount of fuel injection BMQA using the vehicle acceleration instead of the ratio VN. FIG. 8 shows the characteristics of a correction coefficient KDV1 relative to the vehicle acceleration. The correction coefficient KDV1 decreases as the vehicle acceleration decreases. If the vehicle acceleration is small, the rate of increase of the engine rotation speed is smaller than the rate of increase for a large vehicle acceleration. The engine spends a long time in the region where smoke is easily generated, so the corrected amount of fuel injection BMQA needs to be suppressed low.

Figure 9:
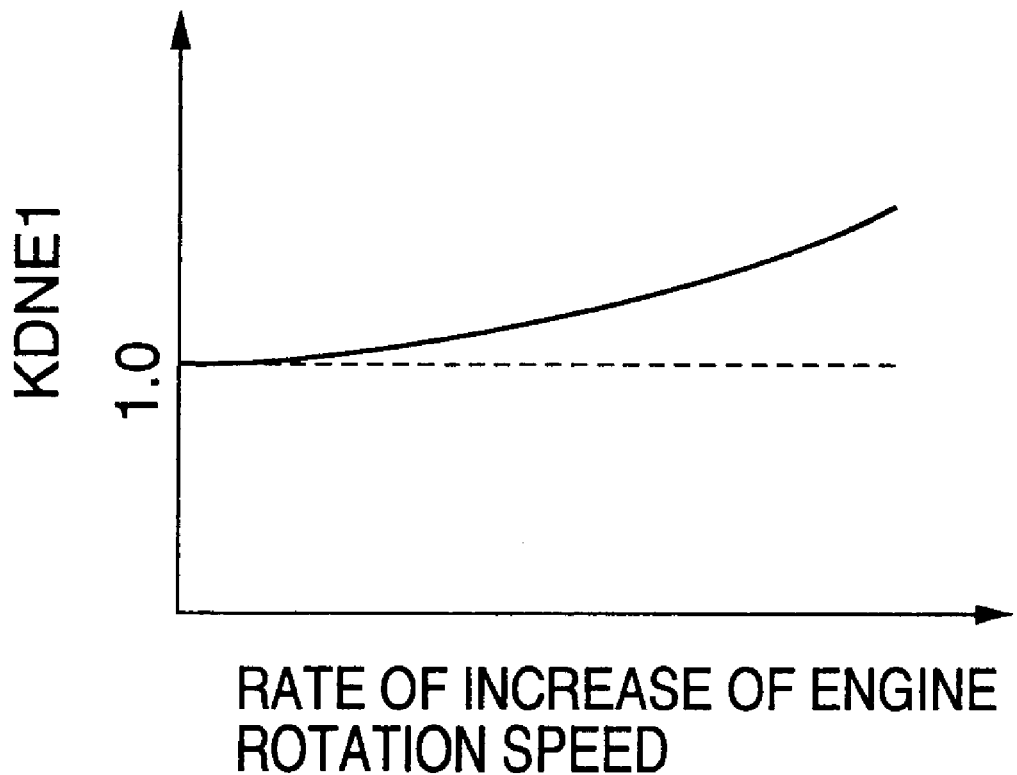
FIG. 9 is a diagram describing the characteristics of a map of a correction coefficient according to a rate of the increase of the engine rotation speed, stored by the controller according to a third embodiment of this invention.

Next, referring to FIG. 9, a third embodiment of this invention will be described. According to this embodiment, the controller 1 determines the corrected amount of fuel injection BMQA for suppressing smoke using the rate of increase of the engine rotation speed instead of the ratio VN. FIG. 9 shows the characteristics of a correction coefficient KDNE1 relative to the rate of increase of the engine rotation speed. In the first and second embodiments, the ratio VN or the vehicle acceleration was used to set the correction coefficient. On the other hand, in the third embodiment, the engine rotation speed is directly used to set the correction coefficient. When the rate of increase of the engine rotation speed is slow, the engine spends a long time in the region where smoke is easily generated. Therefore, the corrected amount of fuel injection BMQA is limited by making the correction coefficient KDNE1 smaller as the rate of increase of the engine rotation speed becomes smaller.

Figure 10:
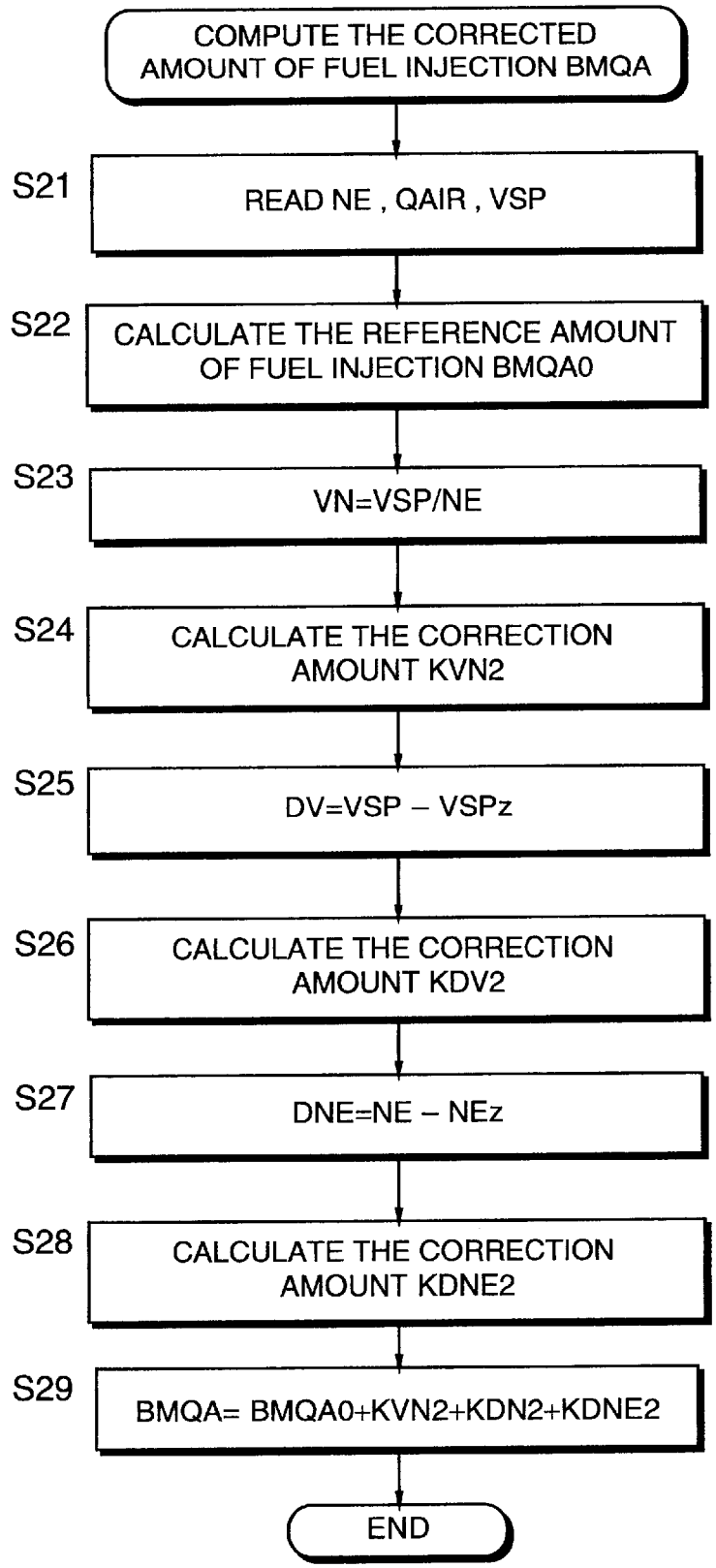
FIG. 10 is a flowchart describing another computation routine relating to a corrected amount of fuel injection for the purpose of suppressing smoke generation, performed by the controller according to a fourth embodiment of this invention.

Next, referring to FIG. 10, a fourth embodiment of this invention will be described. According to this embodiment, the controller 1 applies a routine shown in FIG. 10 instead of the routine shown in FIG. 4 for calculating the corrected amount of fuel injection BMQA for suppressing smoke. In this routine, the processing of the steps S21–S23 is identical to the processing of the steps S11–S13 in FIG. 4.

Figure 11:
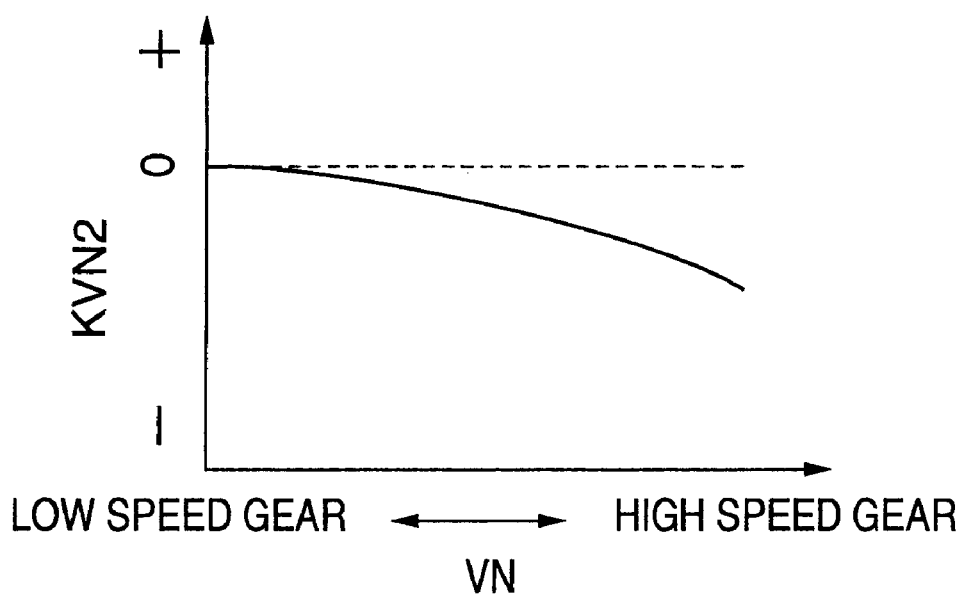
FIG. 11 is a diagram describing the characteristics of a map of a correction amount according to the speed ratio, stored by the controller according to the fourth embodiment of this invention.

In a step S24, a correction amount KVN2 is computed from the ratio VN by looking up a map having the characteristics shown in FIG. 11. Herein, the correction amount KVN2 is set to have a negative value. Referring to FIG. 11, the correction amount KVN2 takes a value of zero when the ratio takes the minimum value, and it increases in absolute value as the ratio VN increases.

In a step S25, a vehicle acceleration DV is calculated by the following equation:

$$DV = VSP - VSPz$$

where VSPz is the value of VSP that is calculated in the previous iteration.

Figure 12:
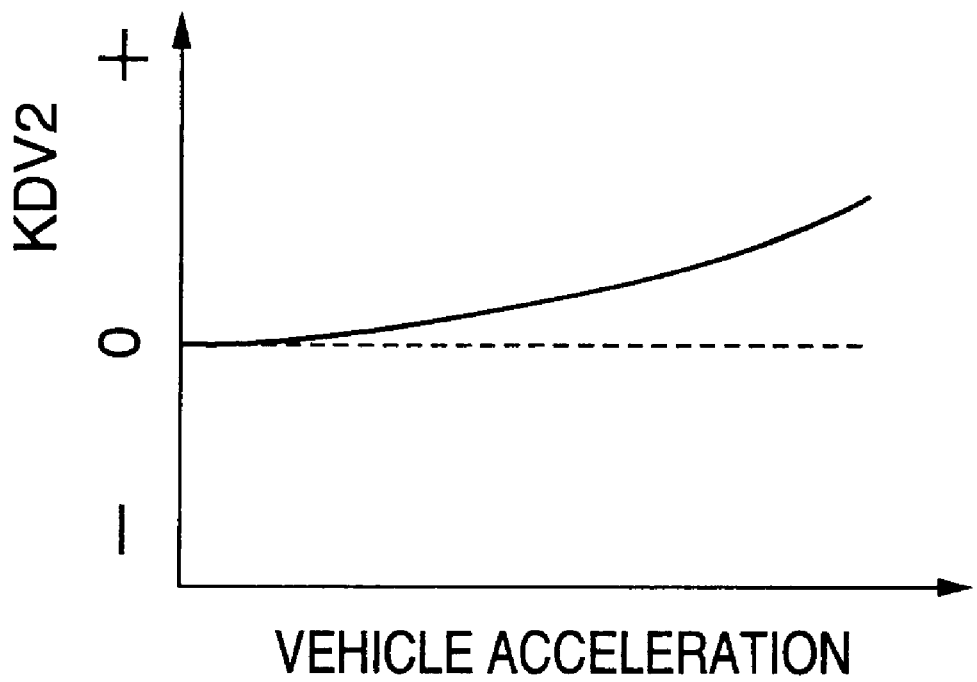
FIG. 12 is a diagram describing the characteristics of a map of a correction amount according to the vehicle acceleration, stored by the controller according to the fourth embodiment of this invention.

In a step S26, a correction amount KDV2 based on the vehicle acceleration is computed from the value of the vehicle acceleration DV by looking up a map having the characteristics shown in FIG. 12. As the vehicle acceleration increases, the correction amount KDV2 also increases. The reason is that the rate of increase of the engine rotation speed is larger as the vehicle acceleration is larger.

In steps S27 and S28, the rate of increase of the engine rotation speed DNE is calculated by the following equation based on the engine rotation speed NE:

$$DNE = NE - NEz$$

where NEz is the value of NE calculated in the previous iteration.

Figure 13:
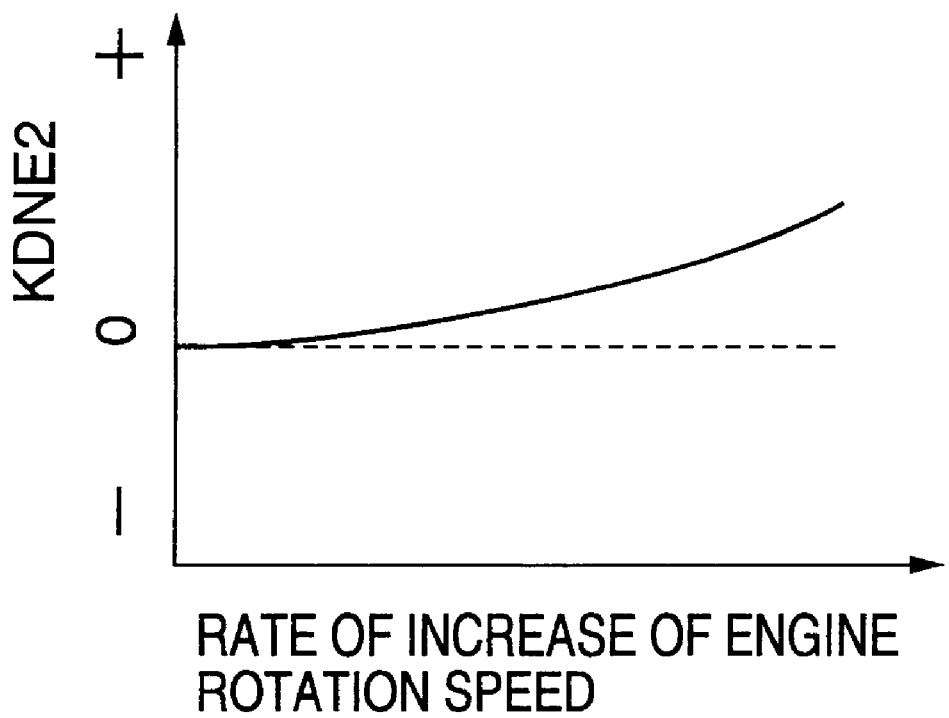
FIG. 13 is a diagram describing the characteristics of a map of a correction amount according to the rate of increase of the engine rotation speed, stored by the controller according to a fourth embodiment of this invention.

Next, a correction coefficient KDNE2 corresponding to the rate of increase of the engine rotation speed DNE is computed by looking up a map having the characteristics shown in FIG. 13. As the rate of increase of the engine rotation speed increases, the correction amount KDNE2 also increases.

In a step S29, the corrected amount of fuel injection BMQA to suppress smoke generation is computed by adding the correction amount KVN2 based on the ratio VN, the correction amount KDV2 based on the vehicle acceleration, and the correction amount KDNE2 based on the rate of increase of the engine rotation speed to the reference amount of fuel injection BMQAO.

In the first embodiment, the controller 1 computed the corrected amount of fuel injection BMQA by multiplying the reference amount of fuel injection BMQAO by the correction coefficient KVN1 based on the ratio VN. In this embodiment, an addition is performed instead of a multiplication to calculate the corrected amount of fuel injection BMQA. Also, whereas the first embodiment introduced only the correction coefficient KVN1 based on the ratio VN, this embodiment improves the control precision by introducing three correction amounts: the correction amount KDV2 based on the vehicle acceleration and the correction amount KDNE3 based on the rate of increase of the engine rotation speed in addition to the correction amount KVN1 based on the ratio VN.

Figure 14:
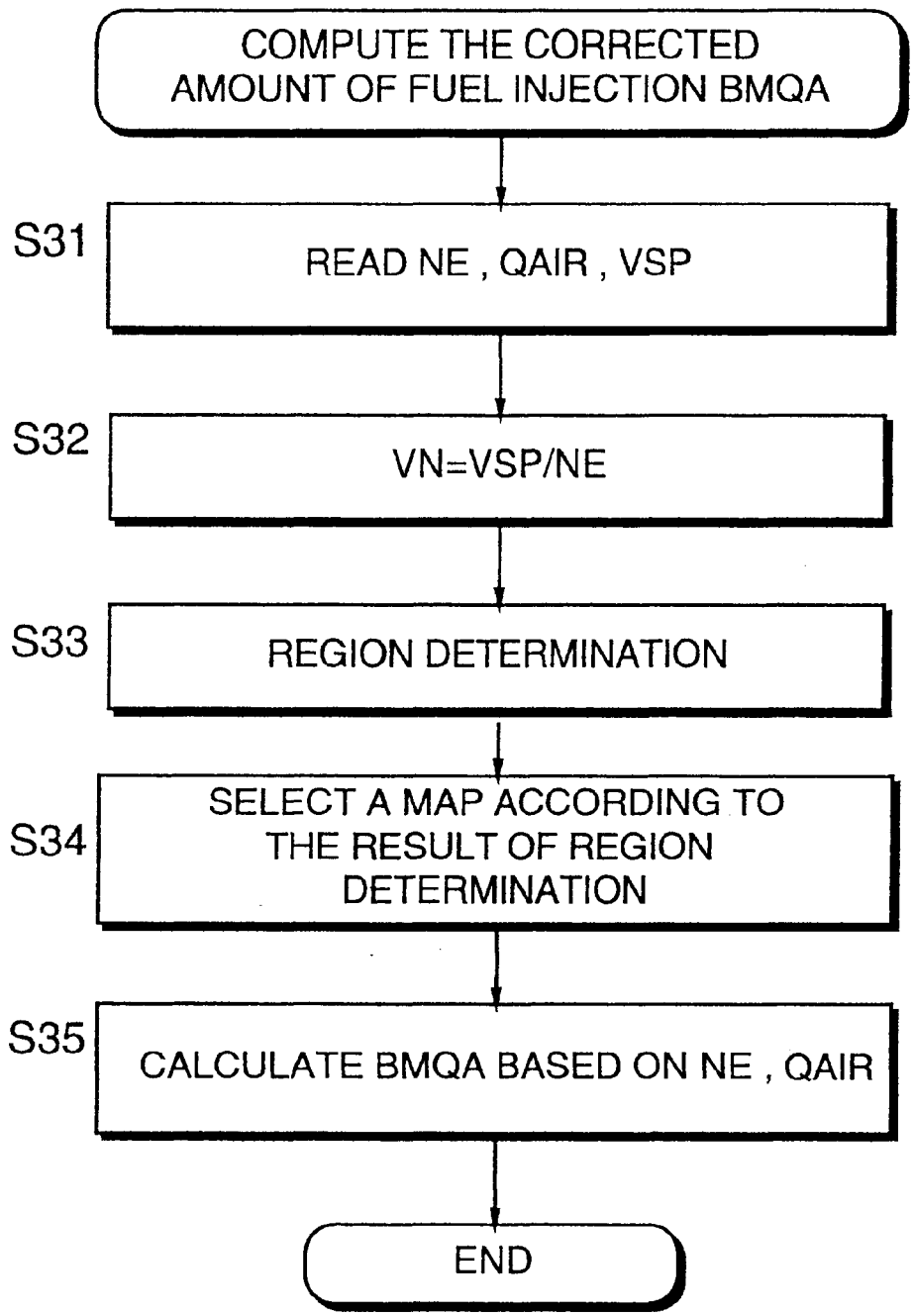
FIG. 14 is a flowchart describing a routine for computing a corrected amount of fuel injection for the purpose of suppressing smoke generation by a region determination, performed by the controller according to a fifth embodiment of this invention.

Next, referring to FIG. 14, a fifth embodiment of this invention will be described. According to this embodiment, the controller 1 performs a routine shown in FIG. 14 instead of the routine shown in FIG. 4 to calculate the corrected amount of fuel injection BMQA for suppressing smoke. In this routine, the processing of the steps S31 and S32 is respectively identical to the processing of the steps S21 and S23 of FIG. 10.

In the step S33, the region determination is performed by comparing the computed value of the ratio VN with predetermined values VN1 and VN2. VN1 and VN2 have the following relation:

$$VN1 < VN2$$

VN1 and VN2 are values for dividing the speed ratio region into three parts. If the ratio VN is less than VN1, ratio VN is in the low speed region, if the ratio VN is between VN1 and VN2, the ratio VN is in the medium speed region, and if the ratio VN is larger than VNT2, the ratio VN is in the high speed region. In the step S33, it is determined in which of these three regions the ratio VN is situated.

The controller 1 stores maps of the corrected amount of fuel injection BMQA for each of these three regions. In a step S34, a map is selected according to the result of the region determination of the step S33. The corrected amount of fuel injection BMQA is then computed by looking up the selected map in a step S35.

FIGS. 15A–15C shows the maps of the corrected amount of fuel injection BMQA provided for each of the three regions. In all of the maps, the corrected amount of fuel injection BMQA is computed using the engine rotation speed NE and intake fresh air amount QAIR as parameters which are representative values of the running condition. However, even if the values of the parameters are identical, the computed corrected amount of fuel injection BMQA is different depending on the map. Specifically, the corrected amount of fuel injection BMQA when the ratio VN is large is less than BMQA when the ratio VN is small. For example, comparing the three maps at a point "A" where the engine rotation speed NE and the intake fresh air amount QAIR are identical, the value of the corrected amount of fuel injection BMQA takes a smaller value when the map for the higher speed region is applied. According to this processing, the difference in the rate of increase of the engine rotation speed based on the ratio VN is reflected in the corrected amount of fuel injection BMQA.

Figure 16:
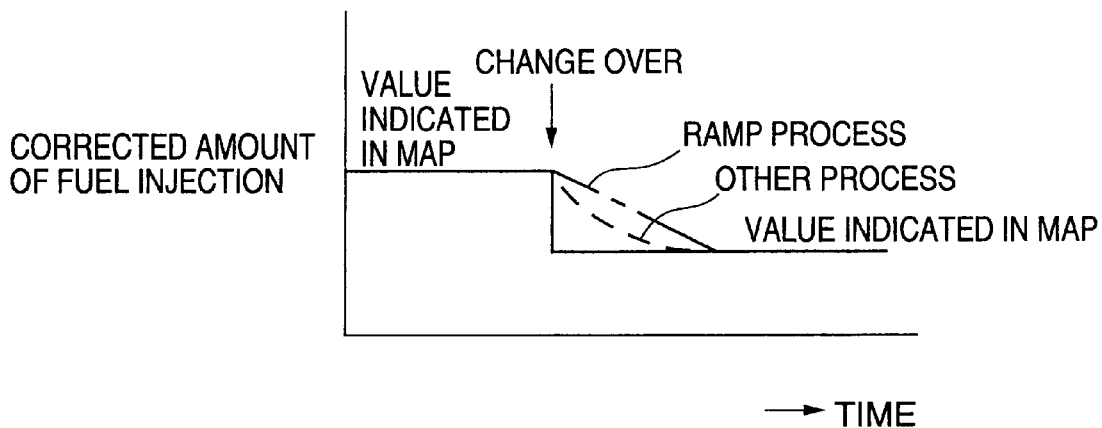
FIG. 16 is a timing chart for describing a corrected amount of fuel injection for the purpose of suppressing smoke generation when a map is changed over by the controller according to the fifth embodiment of this invention.

When individual maps are selected for each region of the ratio VN as in this embodiment, it is necessary to change over the maps, for example, from the low speed region to the medium speed region, or from the medium speed region to the high speed region, due to the variation of the ratio VN. Thus, an abrupt change may occur in the corrected amount of fuel injection BMQA before and after the map changeover as shown by the solid line in FIG. 16. When there is a map change-over, it is preferable to perform processing so that the values before and after the change-over are smoothly joined together as shown by the broken line or dotted line in FIG. 16. This processing may be a ramp process shown by the dotted line, or other process shown by the broken line, in FIG. 16.

The number of regions and number of maps corresponding to these regions is not limited to three. It can be two, four or more. The separation caused by the map change-over is small if the number of maps increases, but the memory capacity required to store the maps in the controller 1 also increases.

The entire contents of Japanese Patent Application P2001-056358 (filed on Mar. 1, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel injection control device for use with a diesel engine mounted on a vehicle, the diesel engine comprising a fuel injector that injects fuel into a combustion chamber, the device comprising:
    a sensor which detects a running state of the vehicle;
    a sensor which detects a state of increase of an engine rotation speed; and
    a programmable controller programmed to:
        calculate a required amount of fuel injection based on the running state of the vehicle;
        set an upper limit of an amount of fuel injection based on the state of increase of the engine rotation speed;
        calculate a corrected amount of fuel injection by limiting the required amount of fuel injection by the upper limit; and
        control the amount of fuel injection of the fuel injector to the corrected amount of fuel injection,
    wherein the engine speed increase state detecting sensor comprises a sensor which detects an engine rotation speed, and the controller is further programmed to compute a rate of increase of the engine rotation speed, and set the upper limit to be smaller as the rate of increase of the engine rotation speed is smaller.

2. The fuel injection control device as defined in claim 1, wherein the vehicle running state detecting sensor comprises a sensor which detects a depression amount of an accelerator pedal with which the vehicle is provided, and a sensor which detects the engine rotation speed.

3. A fuel injection control device for use with a diesel engine mounted on a vehicle, the diesel engine comprising a fuel injector that injects fuel into a combustion chamber, the device comprising:
    a sensor which detects a running state of the vehicle;
    a sensor which detects a state of increase of an engine rotation speed; and
    a programmable controller programmed to:
        calculate a required amount of fuel injection based on the running state of the vehicle;
        set an upper limit of an amount of fuel injection based on the state of increase of the engine rotation speed;
        calculate a corrected amount of fuel injection by limiting the required amount of fuel injection by the upper limit; and
        control the amount of fuel injection of the fuel injector to the corrected amount of fuel injection,
    wherein the engine speed increase state detecting sensor comprises a sensor which detects a speed ratio of a transmission with which the vehicle is provided, and the controller is further programmed to set the upper limit to be larger as the speed ratio is lower.

4. The fuel injection control device as defined in claim 3, wherein the vehicle running state detecting sensor comprises a sensor which detects a depression amount of an accelerator pedal with which the vehicle is provided, and a sensor which detects the engine rotation speed.

5. A fuel injection control device for use with a diesel engine mounted on a vehicle, the diesel engine comprising a fuel injector that injects fuel into a combustion chamber, the device comprising:
    a sensor which detects a running state of the vehicle:
    a sensor which detects a state of increase of an engine rotation speed: and
    a programmable controller programmed to:
        calculate a required amount of fuel injection based on the running state of the vehicle;
        set an upper limit of an amount of fuel injection based on the state of increase of the engine rotation speed;
        calculate a corrected amount of fuel injection by limiting the required amount of fuel injection by the upper limit; and
        control the amount of fuel injection of the fuel injector to the corrected amount of fuel injection,
    wherein the engine speed increase state detecting sensor comprises a sensor which detects a vehicle speed and a sensor which detects an engine rotation speed, and the controller is further programmed to determine the speed ratio based on the ratio of the vehicle speed to the engine rotation speed.

6. The fuel injection control device as defined in claim 5, wherein the controller comprises different maps of the upper limit according to different speed ratio regions, and is further programmed to select one of the maps based on the speed ratio to set the upper limit.

7. The fuel injection control device as defined in claim 5, wherein the controller is further programmed to apply a process to prevent an abrupt change when the map is changed over.

8. The fuel injection control device as defined in claim 5, wherein the vehicle running state detecting sensor comprises a sensor which detects a depression amount of an accelerator pedal with which the vehicle is provided, and a sensor which detects the engine rotation speed.

9. A fuel injection control device for use with a diesel engine mounted on a vehicle, the diesel engine comprising a fuel injector that injects fuel into a combustion chamber, the device comprising:

a sensor which detects a running state of the vehicle:

a sensor which detects a state of increase of an engine rotation speed: and a programmable controller programmed to:

calculate a required amount of fuel injection based on the running state of the vehicle;

set an upper limit of an amount of fuel injection based on the state of increase of the engine rotation speed;

calculate a corrected amount of fuel injection by limiting the required amount of fuel injection by the upper limit; and control the amount of fuel injection of the fuel injector to the corrected amount of fuel injection, wherein the engine speed increase state detecting sensor comprises a sensor which detects a vehicle speed, and the controller is further programmed to compute the acceleration of the vehicle from the variation of the vehicle speed, and set the upper limit to be smaller as the acceleration of the vehicle is smaller.

10. The fuel injection control device as defined in claim 9, wherein the vehicle running state detecting sensor comprises a sensor which detects a depression amount of an accelerator pedal with which the vehicle is provided, and a sensor which detects the engine rotation speed.

11. A fuel injection control method for use with a diesel engine mounted on a vehicle, the diesel engine comprising a fuel injector that injects fuel into a combustion chamber, a sensor which detects a running state of the vehicle, a sensor which detects a state of increase of an engine rotation speed, wherein the engine speed increase state detecting sensor comprises a sensor which detects an engine rotation speed, the method comprising:

calculating a required amount of fuel injection based on the running state of the vehicle;

computing a rate of increase of the engine rotation speed;

setting an upper limit of an amount of fuel injection based on the state of increase of the engine rotation speed;

setting the upper limit to be smaller as the rate of increase of the engine rotation speed is smaller;

calculating a corrected amount of fuel injection by limiting the required amount of fuel injection by the upper limit; and controlling the amount of fuel injection of the fuel injector to the corrected amount of fuel injection.

12. A fuel injection control device for use with a diesel engine mounted on a vehicle, the diesel engine comprising a fuel injector that injects fuel into a combustion chamber, the device comprising:

means for detecting a running state of the vehicle;

means for detecting a state of increase of an engine rotation speed;

means for calculating a required amount of fuel injection based on the running state of the vehicle;

means for setting an upper limit of an amount of fuel injection based on the state of increase of the engine rotation speed;

means for calculating a corrected amount of fuel injection by limiting the required amount of fuel injection by the upper limit; and means for controlling the amount of fuel injection of the fuel injector to the corrected amount of fuel injection, wherein the means for detecting the state of increase of the engine rotation speed comprises means for detecting an engine rotation speed, and wherein the means for setting the upper limit comprises means for computing a rate of increase of the engine rotation speed, and means for setting the upper limit to be smaller as the rate of increase of the engine rotation speed is smaller.

* * * * *